Sept. 3, 1940.  E. L. WALTERS  2,213,422

GLASS INSPECTION APPARATUS

Filed Sept. 22, 1937   5 Sheets-Sheet 1

Inventor
EMMETT L. WALTERS.
By Frank Fraser
Attorney

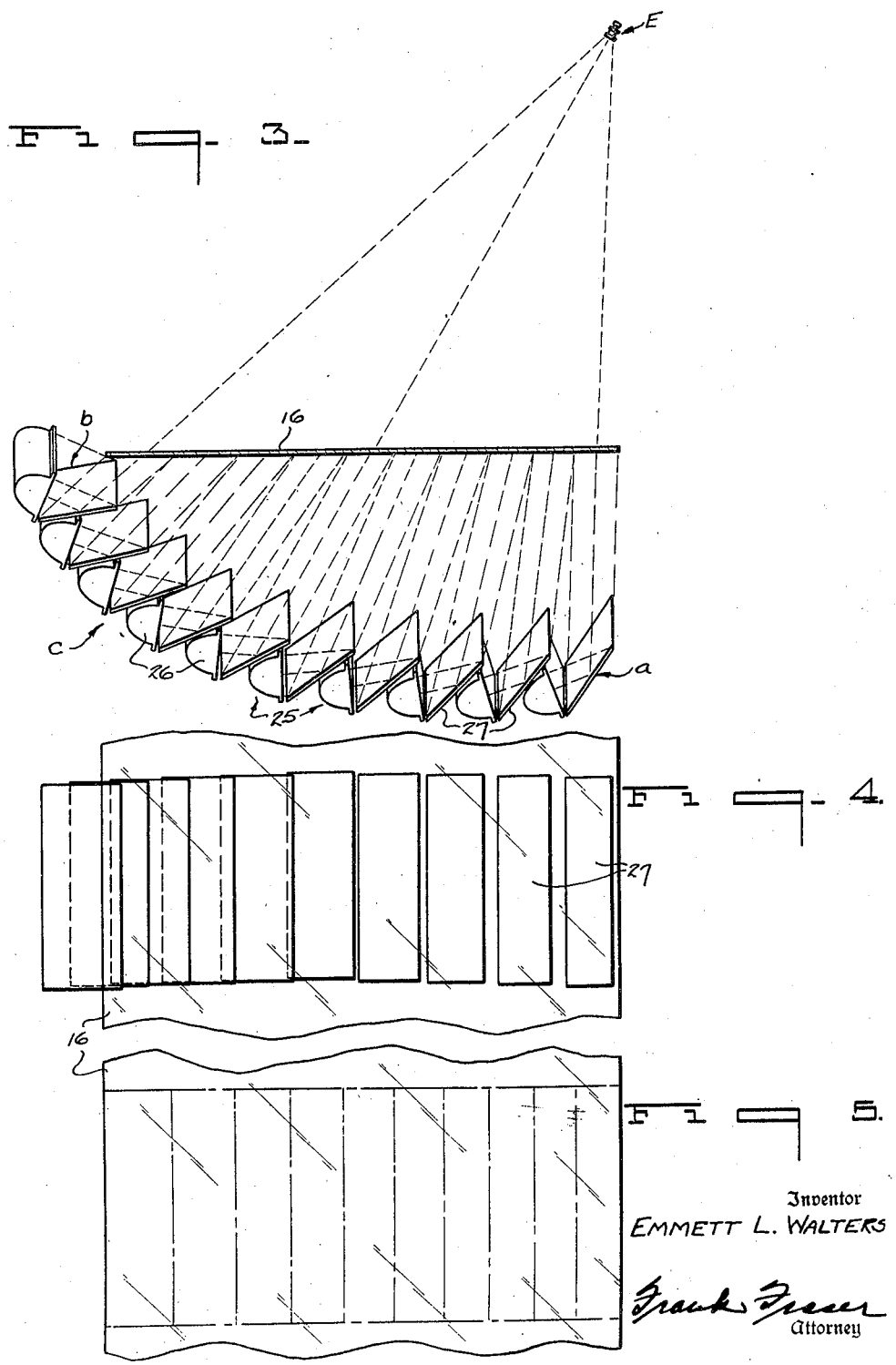

Sept. 3, 1940.  E. L. WALTERS  2,213,422
GLASS INSPECTION APPARATUS
Filed Sept. 22, 1937   5 Sheets—Sheet 3
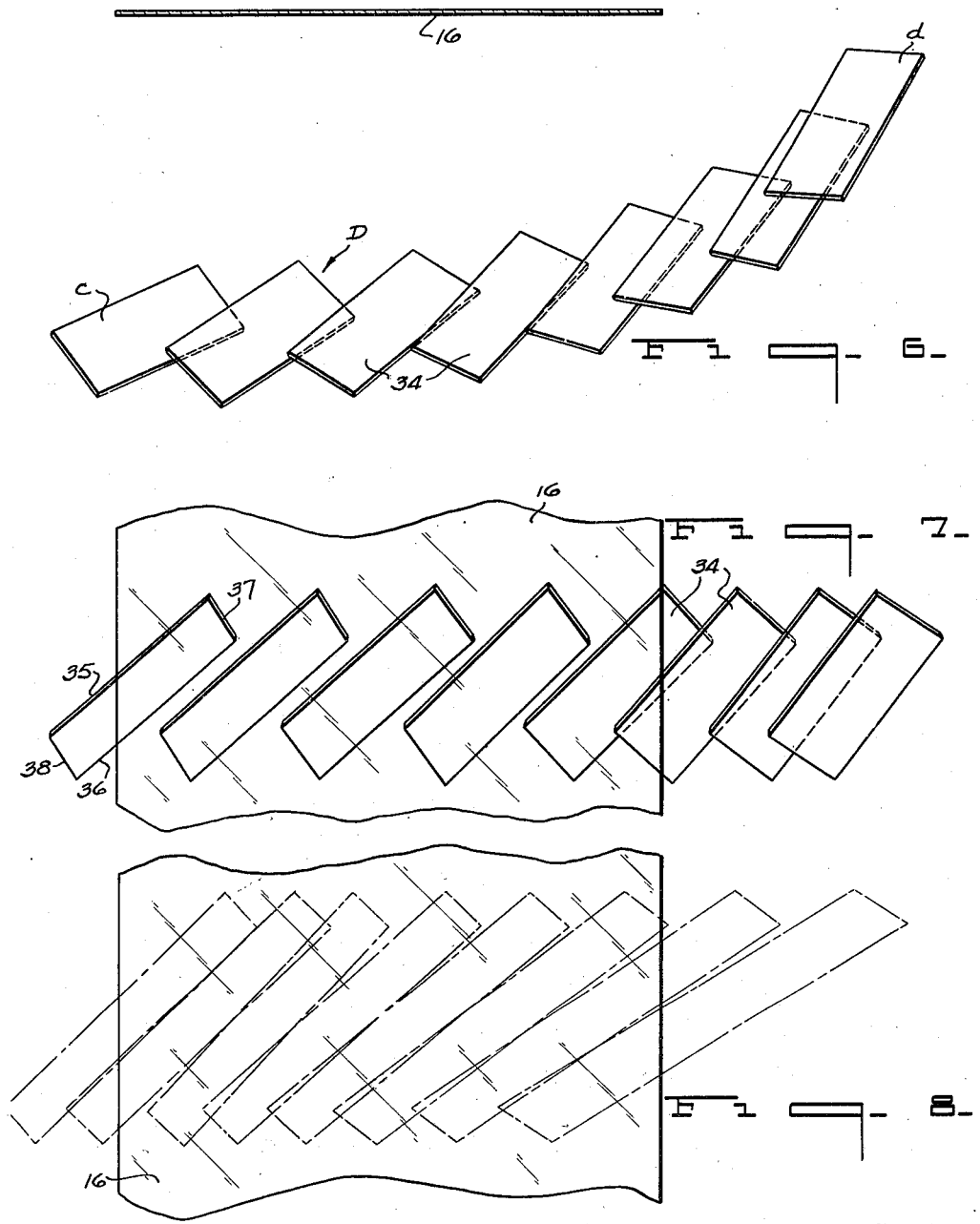
Inventor
EMMETT L. WALTERS.
By Frank Fraser
Attorney

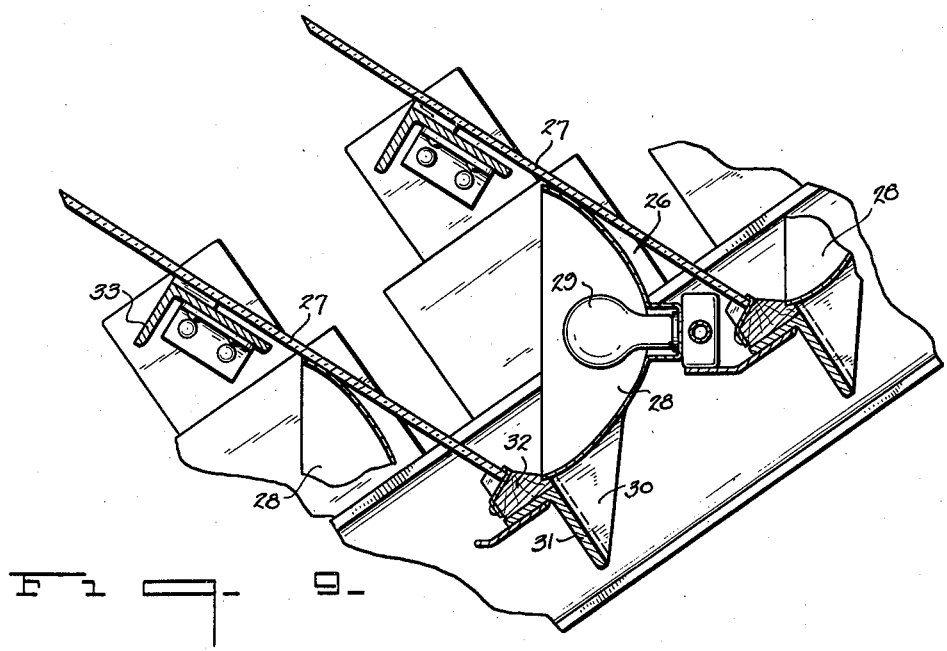

Sept. 3, 1940.    E. L. WALTERS    2,213,422
GLASS INSPECTION APPARATUS
Filed Sept. 22, 1937    5 Sheets-Sheet 5

Inventor
EMMETT L. WALTERS.
By Frank Fraser
Attorney

Patented Sept. 3, 1940

2,213,422

UNITED STATES PATENT OFFICE 2,213,422

GLASS INSPECTION APPARATUS

Emmett L. Walters, Toledo, Ohio, assignor to Libbey-Owens-Ford Glass Company, Toledo, Ohio, a corporation of Ohio Application September 22, 1937, Serial No. 165,015

2 Claims. (Cl. 88—14)

The present invention relates to an apparatus for inspecting sheet glass and constitutes an improvement upon my Patent 2,046,045, issued June 30, 1936.

The inspection apparatus disclosed in said patent embodies separate means for forming two spaced bands of polarized light extending transversely of the glass sheet, in combination with two analyzer units, one being provided for and adapted to cooperate with each light poralizing means. With such an arrangement, however, it is necessary to either employ two inspectors, one for each analyzer unit, or for a single inspector to observe the glass first through one analyzer unit and then the other in order to check the sheet across its entire width.

It is the object of this invention to provide a more compact and efficient arrangement for facilitating the inspection of the glass sheet throughout its entire width simultaneously and by a single inspector. According to the invention, the two bands of polarized light which extend transversely of the glass sheet are superimposed one upon the other rather than being spaced apart as in my earlier patent so that there is provided, in effect, but a single band of polarized light. Also, instead of using two analyzer units, only a single unit is necessary, said unit comprising two analyzers, one being provided for and set to analyze the light from each of the light polarizing means. Consequently, a single inspector viewing the glass through the single analyzer unit will be able to inspect the sheet across its entire width without moving from his position. Such an arrangement is not only more compact but permits a more rapid and efficient inspection of the glass sheet.

Other objects and advantages of the invention will become more apparent during the course of the following description when taken in connection with the accompanying drawings.

In the drawings wherein like numerals are employed to designate like parts throughout the same:

Fig. 3 is a transverse sectional view showing somewhat diagrammatically the light polarizing means for use in the transverse inspection of the glass sheet;

Fig. 4 is a diagrammatic plan view showing the arrangement of the light polarizing reflectors of Fig. 3;

Fig. 5 is a plan view showing in broken lines the pattern of light formed upon the glass sheet when the polarizing reflectors are arranged as in Fig. 4;

Fig. 6 is a transverse sectional view showing the arrangement of the light polarizing reflectors for obtaining the diagonal inspection of the glass sheet;

Fig. 7 is a diagrammatic plan view of the light polarizing reflectors of Fig. 6;

Fig. 8 is a plan view showing in broken lines the pattern of light formed upon the glass when the polarizing reflectors are arranged as in Figs. 6 and 7;

Fig. 9 is a vertical longitudinal sectional view through a portion of the light polarizing means showing in enlarged detail one of the polarizing units;

Fig. 10 is a perspective view of the analyzer unit;

Fig. 11 is a sectional view of one of the analyzers taken substantially on line 11—11 of Fig. 10;

Fig. 12 is a sectional view taken substantially on line 12—12 of Fig. 10;

Figure 1:
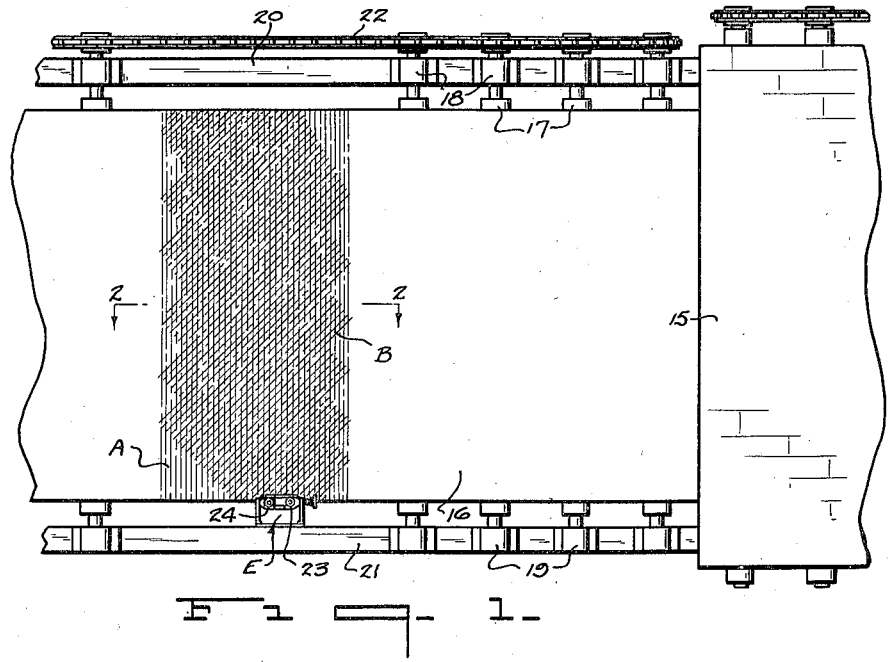
Fig. 1 is a plan view illustrating diagrammatically the two bands of polarized light superimposed upon one another and formed by the light polarizing means provided by the invention.

Referring now to the drawings and particularly to Fig. 1, the numeral 15 designates the outlet end of a horizontal annealing leer of any conventional or preferred construction and 16 a sheet or ribbon of glass emerging therefrom. The glass sheet, upon issuing from the leer, is received and carried forwardly upon a series of horizontally aligned rolls 17 journaled at their opposite ends in bearings 18 and 19 mounted upon fixed horizontal supports 20 and 21 respectively. The rolls 17 are spaced so as not to in any way interfere with the inspection apparatus and may be positively driven from one end through a sprocket and chain drive or the like 22.

The glass sheet 16, upon leaving the annealing leer 15, is adapted to be inspected and marked for defects in a substantially continuous manner as it is being carried forwardly. In order to effect a complete and thorough inspection of the glass, it is adapted to be inspected from two different angles by means of inspection apparatus so constructed and arranged as to cover the entire area of the sheet transversely thereof and render visible all of the defects therein irrespective of the direction in which they might extend. More specifically, the sheet is caused to undergo a so-called diagonal inspection and also a transverse inspection, the transverse inspection covering certain spaced areas of the sheet transversely thereof and the diagonal inspection covering the remaining and complemental areas of said sheet transversely thereof, so that as a result a single inspector can readily observe defects extending in any direction across the glass.

The inspection of the glass is achieved by the use of polarized light, and in carrying out the invention two separate light polarizing means are employed forming two bands of polarized light which are superimposed upon one another to form in effect a single band of sufficient width parallel to the travel of the glass sheet whereby a single inspector can observe and mark continuously all ream, strain, etc. present in the glass. A single analyzer unit is employed and is provided with two analyzers, one being provided for and set to analyze the light from each light polarizing means. Thus, one analyzer is arranged so as to cover spaced areas of the illuminated zone complementary to other spaced areas of said zone covered by the other analyzer, as will be more fully hereinafter described.

As illustrated in Fig. 1, the two bands of polarized light are indicated diagrammatically at A and B, both bands of light being arranged at an angle of 90 degrees with respect to the path of travel of the glass sheet and superimposed one upon the other. The vibrations of the band of polarized light A extend parallel to the glass travel while the vibrations of the band of polarized light B extend substantially at an angle of forty-five degrees with respect to the glass travel. The band of light A is formed by the light polarizing means utilized in making the transverse inspection and designated in its entirety by the letter C (Figs. 3 and 4), while the band of light B is created by the light polarizing means D (Figs. 6 and 7) employed for effecting the diagonal inspection. As will be noted in Fig. 2, the light polarizing means C and D are both arranged beneath the glass sheet. The means for analyzing the polarized light comprises an analyzer unit E arranged above the sheet and to one side thereof, said analyzer unit comprising two analyzers 23 and 24, one being provided for and set to analyze the polarized light from each light polarizing means C and D which create the bands of light A and B respectively.

As shown in Figs. 3 and 4, the light polarizing means C, forming the band of polarized light A, consists of a plurality of relatively small polarizing units 25, each comprising a source of illumination 26 and an inclined polarizing reflector 27. The polarizing surfaces of the reflectors are arranged relative to one another in such a manner that the beams of polarized light from the center of each surface converge at a point above and to one side of the edge of the glass sheet being inspected. The analyzer unit E is adapted to be located at this apex or, in other words, at the meeting line of the beams of polarized light. It will be noted that the angle of inclination of the polarizing reflectors 27 gradually decreases from the reflector $a$ to the reflector $b$, the reflector $a$ being arranged at substantially a sixty degree angle to the horizontal while reflector $b$ is arranged at an angle of approximately ten degrees to the horizontal. However, the light sources are so arranged that the angle of reflection of the rays of light from each reflector will be substantially the same. The broken lines in Fig. 3 indicate the propagation of the polarized light through the sheet of glass.

Although a single large polarizing surface may be used if desired, a series of relatively small polarizing units 25 are preferably employed since with such an arrangement the system is much more compact and more efficient because of the shorter distance required for the light to travel before reaching the glass sheet. Moreover, the use of a plurality of relatively small polarizing units provides cheaper cost than a single unit of sufficient size to give the required area of polarized light. Also, ease of maintenance and a better cooling condition in dissipating the heat generated by the source of illumination.

More specifically, and upon reference to Fig. 9, it will be seen that the source of illumination 26 for each polarizing unit 25 comprises a reflector 28 containing one or more incandescent lamps 29, depending upon the width of the band of polarized light desired. The reflector 28 may be carried by a plurality of spaced brackets 30 secured to an angle iron 31 suitably supported at each end. The polarizing reflector 27 preferably consists of a sheet or slab of black glass which is practically opaque and provided with a polished surface so that it forms a good reflector. The reflector is placed at such an angle that the light from the lamps 29 will be polarized, the polarized rays being reflected upwardly through the glass sheet and analyzer unit as explained above. The polarizing reflector 27 may be supported at its inner edge upon a horizontal wooden strip 32 and adjacent its outer end by a horizontal angle member 33.

To accomplish the transverse inspection, the polarizing reflectors 27 extend longitudinally of the glass sheet and are arranged side by side transversely thereof and relative to one another as shown in Fig. 4, with the areas of light formed upon the glass by the said reflectors being indicated by the broken lines in Fig. 5. The areas of light so formed cooperate to produce the band of polarized light A. On the other hand, the polarizing units of the light polarizing means D are adapted to be arranged to effect the diagonal inspection of the glass and to this end the reflectors 34 thereof extend obliquely beneath the sheet and are arranged side by side transversely thereof as shown in Figs. 6 and 7. Thus, the arrangement of the reflectors is such that they form the band of polarized light B extending transversely of the sheet, while the vibrations of the polarized light extend at an angle of forty-five degrees with respect to the glass travel.

Figure 2:
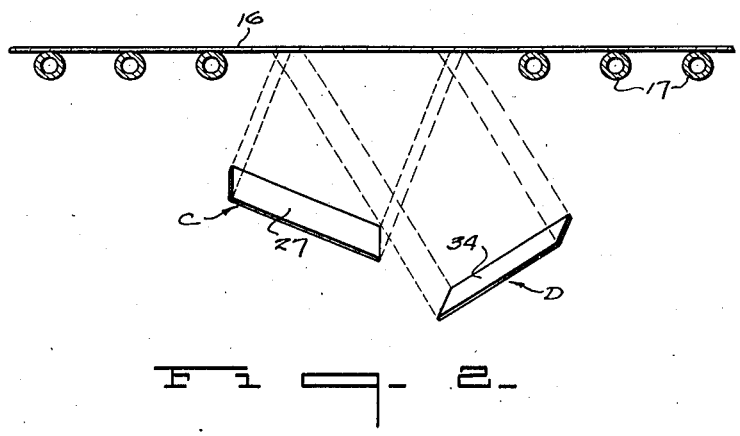
Fig. 2 is a longitudinal sectional view taken substantially on line 2—2 of Fig. 1.

To obtain the above result, the polarizing reflectors 34 are tilted both laterally and longitudinally. More specifically, each reflector is tilted slightly about its longitudinal axis so that the longitudinal edge 35 thereof will be slightly above the opposite edge 36. The reflector is further tipped about its transverse axis to bring the end edge 37 thereof slightly higher than the opposite end edge 38. The angle of lateral inclination decreases from the reflector $c$ to the reflector $d$, while at the same time the longitudinal inclination increases from reflector $c$ to reflector $d$. When the reflectors are arranged beneath the glass sheet in this manner, the areas of light formed thereby upon the glass will be as shown by the broken lines in Fig. 8, and which areas of light cooperate to form the band of polarized light B. As illustrated in Fig. 2, the polarizing reflectors 27 and 34 of the light polarizing means C and D are also arranged relative to one another so that the bands of polarized light A and B formed thereby will be superimposed one upon the other as shown in Fig. 1.

The construction of the analyzer unit E is best shown in Figs. 10, 11 and 12, said analyzer unit consisting of the pair of analyzers 23 and 24 carried by a substantially rectangular supporting plate 39 provided at its opposite ends with trunnions 40 and 41 loosely received within the legs 42 and 43 respectively of the substantially U-shaped supporting bracket 44 which may be suitably mounted above and to one side of the path of travel of the sheet upon the horizontal supporting member 21. It is preferred that two analyzers 23 and 24 be employed so that the inspector may simultaneously observe with both eyes the bands of polarized light A and B, each analyzer being set to receive the light from one of the light polarizing means. The supporting plate 39 can be rocked upon the trunnions 40 and 41 to move the analyzers into different positions to facilitate the inspection of the glass. Threaded upon the outer end of trunnion 41 is a finger piece 45 and interposed between the said finger piece and leg 43 of bracket 44 is a compression spring 46 which serves to maintain the plate 39 and likewise the analyzers 23 and 24 in adjusted position.

The analyzers 23 and 24 are of the ordinary type carrying a Nicol prism consisting of the two crystals 47 and 48 supported in a rotatable sleeve 49 so that the prism may be adjusted about its axis e. The sleeve 49 carries at one end thereof an eye piece 50 and at its opposite end a mica quarter-wave or selenite plate 51 which, while preferably used, is not absolutely essential.

The analyzer 23 is stationarily mounted upon the supporting plate 39 while the analyzer 24 is movable toward and away from analyzer 23 to fit the observer's eyes. Thus, the rotatable sleeve 49 of analyzer 24 may be rotatably mounted in a substantially square block 52 slidably received within a horizontal guideway 53 in supporting plate 39. The analyzer can be secured in adjusted position by means of a set screw 54 passing through a slot 55 and received within block 52. This screw, however, is such that it will not interfere with the rotation of the analyzer about its axis e.

As is well understood, in the case of polarized light, the vibrations are all in one plane which is transverse to the direction of the rays. Therefore, before the polarized light passes through the glass sheet 16, it vibrates in only a single predetermined plane. On the other hand, the analyzing Nicols are adjusted to pass light which is vibrating only in a plane at right angles to the vibrations of the polarized light. When the glass to be inspected is carried through the inspection apparatus, the polarized light will be refracted as it passes through the glass due to the presence of strain, ream, or other defects therein, as a result of which the plane of vibration of the light will be changed so that it can be observed through the analyzers. In other words, any defects which are present in the glass sheet will cause a refraction of the rays of polarized light, resulting in their vibration in a plane approaching right angles to the plane of vibration of the polarized light, and these rays can then be observed through the analyzers.

The rays of light passing through the glass sheet to the analyzers will vary in color (when using the quarter-wave or selenite plate) and intensity, depending upon the conditions of strain, ream, and other defects in the glass, and the colors and/or intensities as observed through the analyzers at different points across the sheet will indicate the condition of the glass with respect to strain, ream, etc., and any variation in these conditions is readily observed through the analyzers.

Figure 13:
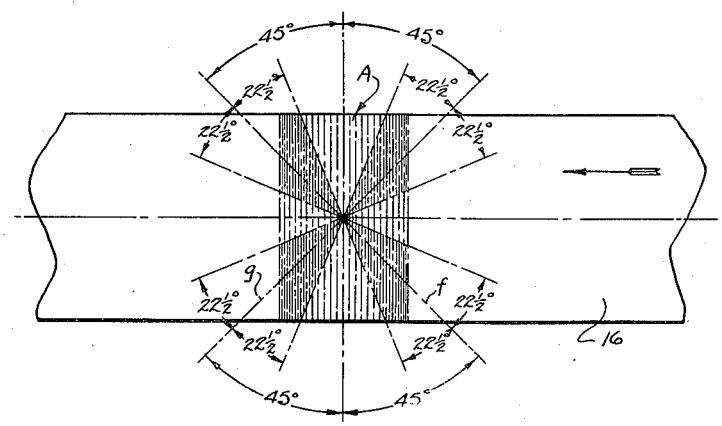
Fig. 13 is a diagrammatic plan view showing the areas of the glass sheet covered by the transverse inspection.
Figure 14:
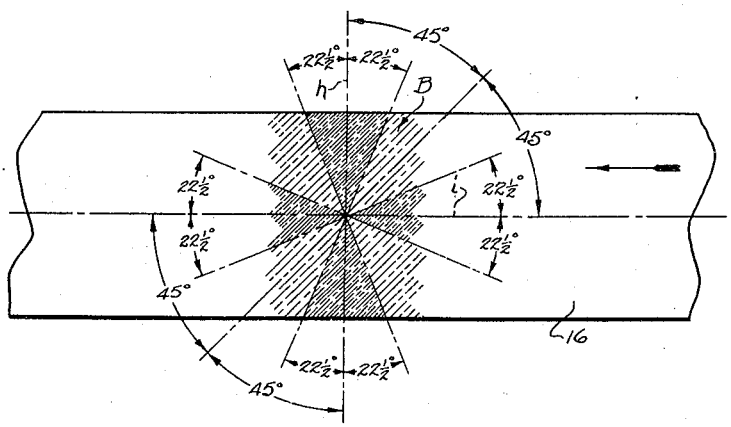
Fig. 14 is a diagrammatic plan view showing the areas of the glass sheet covered by the diagonal inspection.

As brought out above, the defects present in sheet glass do not always extend in the same direction and through actual experiment, it has been determined that streaks or bands of ream or unhomogeneity in sheet glass are most easily observed when they extend at an angle of forty-five degrees with or lateral to the vibrations of polarized light. I have discovered that when a glass sheet is rotated about its axis parallel to the propagation of the polarized light and through an angle of 22½ degrees either side of the aforementioned angle of 45 degrees, the defects in the glass are still sufficiently visible for practical inspection. Therefore, when inspecting a continuous strip of moving glass, with the vibrations of polarized light extending parallel to the glass travel (such as in effecting the transverse inspection of the glass), the zones of observation or the areas of the glass covered by one of the analyzers, such as analyzer 23, will be as shown by the darkened areas in Fig. 13. In other words, the areas visible for inspection will extend 22½ degrees at either side of a line extending at an angle of 45 degrees across the sheet in either direction. That is to say, during the transverse inspection, the inspector, observing the glass through analyzer 23, will be able to observe all defects extending within the included angle of the darkened areas or, otherwise stated, 22½ degrees at either side of the diagonal lines f and g. On the other hand, with the vibrations of polarized light extending at an angle of forty-five degrees with respect to the glass travel (such as in effecting the diagonal inspection of the glass), the zones of observation or, in other words, the areas of the glass covered by the other analyzer 24 will be as shown by the darkened areas in Fig. 14. Thus, the areas visible for inspection will extend 22½ degrees at either side of a line drawn transversely across the sheet and also 22½ degrees at either side of a line drawn longitudinally through the center of the sheet. Hence, during the diagonal inspection, the inspector observing the glass through the analyzer 24 will be able to observe all defects within the darkened areas extending 22½ degrees at either side of the transverse line h and longitudinal line i. From the above, it will be readily apparent that when the darkened areas of the band of light A in Fig. 13 are superimposed over the darkened areas of the band of light B in Fig. 14, the entire area of the glass sheet transversely thereof will be covered by the combined diagonal and transverse inspections. Hence, by both transverse and diagonal inspection, an inspector observing the glass through the analyzers 23 and 24 will be able to observe all defects transversely of the sheet. Furthermore, by setting the analyzers 23 and 24, so that one analyzer will analyze the light from each light polarizing means, a single inspector can effect both the transverse and diagonal inspections simultaneously and without moving from his position. The proper setting of the analyzers can be accomplished by turning them about their axes e. The result obtained is that a single inspector can readily and conveniently observe any unhomogeneity or other defects extending in any direction across the glass. That is to say, one of the analyzers 23 or 24 is set to transmit light from one of the polarizing means C or D, while the other analyzer is set to transmit light from the other polarizing means, so that an operator can observe the two bands of polarized light A and B simultaneously and thereby detect defects extending in any direction across the entire width of the sheet. This inspection can be accomplished as the glass sheet is being carried forwardly so that the sheet can be inspected and marked in a substantially continuous manner. All of the defects present in the glass sheet irrespective of the direction in which they may extend will be plainly visible and can be easily detected through the analyzers thereby permitting a complete and thorough inspection of the sheet throughout its entire area.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In an inspection apparatus for sheet glass, the combination of means for supporting the sheet and carrying it forwardly, light polarizing means arranged at one side of the supporting means for directing polarized light through the sheet to form a band of polarized light extending across said sheet, with the vibrations of said polarized light extending substantially at an angle of 45 degrees with respect to the glass travel, separate light polarizing means also arranged at the same side of the supporting means for directing polarized light through the sheet to form a second band of polarized light extending transversely thereof, with the vibrations of said second band of polarized light extending parallel to the glass travel, said first and second mentioned light polarizing means being so arranged relative to one another to superimpose the bands of polarized light formed thereby one upon the other, and an analyzer unit arranged at the opposite side of the sheet supporting means and comprising two analyzers adapted to transmit light polarized in different planes and mounted in such spaced relation as to permit the same to be used simultaneously by a single inspector, one of said analyzers being set to transmit light from said first light polarizing means while the other analyzer is set to transmit light from said second light polarizing means so that the operator can observe the two superimposed bands of polarized light simultaneously and thereby detect defects extending in any direction across the entire width of the sheet.

2. In an inspection apparatus for sheet glass, the combination of means for supporting the sheet and carrying it forwardly, light polarizing means arranged at one side of the supporting means and including a plurality of polarizing units arranged side by side, each unit comprising a source of illumination and an inclined polarizing reflector arranged in opposition to the source of illumination in position to receive the light therefrom and reflect the polarized portion thereof through the glass sheet, the reflectors of the several polarizing units being so arranged with respect to one another and relative to the supporting means to form a band of polarized light extending across said sheet, with the vibrations of said polarized light extending substantially at an angle of 45 degrees with respect to the glass travel, separate light polarizing means arranged at the same side of the supporting means and also including a plurality of polarizing units arranged side by side, each comprising a source of illumination and an inclined polarizing reflector arranged in opposition to the source of illumination in position to receive the light therefrom and reflect the polarized portion thereof through the glass sheet, the reflectors of the several last-mentioned polarizing units being so arranged with respect to one another and relative to the supporting means to form a second band of polarized light extending transversely of said sheet, with the vibrations of said second band of polarized light extending parallel to the glass travel, said first and second mentioned light polarizing means being so arranged relative to one another to superimpose the bands of polarized light formed thereby one upon the other, and an analyzer unit arranged at the opposite side of the sheet supporting means and comprising two analyzers adapted to transmit light polarized in different planes and mounted in such spaced relation as to permit the same to be used simultaneously by a single inspector, one of said analyzers being set to transmit light from said first light polarizing means while the other analyzer is set to transmit light from said second light polarizing means so that the operator can observe the two superimposed bands of polarized light simultaneously and thereby detect defects extending in any direction across the entire width of the sheet.

EMMETT L. WALTERS.